(12) United States Patent
Tico et al.

(10) Patent No.: US 7,558,405 B2
(45) Date of Patent: Jul. 7, 2009

(54) MOTION FILTERING FOR VIDEO STABILIZATION

(75) Inventors: Marius Tico, Tampere (FI); Markku Vehviläinen, Tampere (FI)

(73) Assignee: Nokia Corporation, Espoo (FI)

( * ) Notice: Subject to any disclaimer, the term of this patent is extended or adjusted under 35 U.S.C. 154(b) by 762 days.

(21) Appl. No.: 11/174,297

(22) Filed: Jun. 30, 2005

(65) Prior Publication Data

US 2007/0002146 A1   Jan. 4, 2007

(51) Int. Cl.
  G06K 9/00 (2006.01)
  H04N 7/14 (2006.01)
  H04N 5/228 (2006.01)
(52) U.S. Cl. ............... 382/107; 348/14.1; 348/208.1
(58) Field of Classification Search ............ 382/103, 382/107, 210, 211, 236, 260, 261, 262, 263, 382/264, 265; 348/14.1, 69, 154, 155, 208.1, 348/208.2, 208.16, 352, 407.1, 431.1, 97, 348/620, 665, 667, 835; 396/153, 492
See application file for complete search history.

(56) References Cited

U.S. PATENT DOCUMENTS

| | | | |
|---|---|---|---|
| 5,107,293 A * | 4/1992 | Sekine et al. | 396/55 |
| 5,280,530 A * | 1/1994 | Trew et al. | 382/103 |
| 5,614,945 A * | 3/1997 | Sekine et al. | 348/207.99 |
| 6,157,677 A * | 12/2000 | Martens et al. | 375/240.16 |
| 7,119,837 B2 * | 10/2006 | Soupliotis et al. | 348/208.99 |
| 7,489,341 B2 * | 2/2009 | Yang et al. | 348/208.99 |
| 2006/0017814 A1 * | 1/2006 | Pinto et al. | 348/208.4 |

OTHER PUBLICATIONS

"Image Sequence Stabilisation Using Fuzzy Adaptive Kalman Filtering;" M.K. Gullu, E. Yaman and S. Erturk; Electronics Letters; vol. 39, Issue 5, Mar. 6, 2003, pp. 429-431.

"Digital Image Stabilization With Sub-Image Phase Correlation Based Global Motion Estimation;" S. Erturk; Consumer Electronics, IEEE Transactions; vol. 49, Issue 4, Nov. 2003, pp. 1320-1325.

"Translation, Rotation and Scale Stabilisation Of Image Sequences;" S. Erturk; Electronics Letters; vol. 39, Issue 17, Aug. 21, 2003, pp. 1245-1246.

"Image Sequence Stabilisation Based on Kalman Filtering of Frame Positions;" S. Erturk; Electronics Letters; vol. 37, Issue 20, Sep. 27, 2001, pp. 1217-1219.

(Continued)

*Primary Examiner*—Abolfazl Tabatabai
(74) *Attorney, Agent, or Firm*—Alfred A. Fressola; Ware, Fressola, Van Der Sluys & Adolphson LLP (57) ABSTRACT

For applying a motion filter of a video stabilization system to a sequence of video frames, an estimate of a motion in the current video frame compared to a first video frame of the sequence of video frames is received. Based on the received motion estimate and on at least one state variable of the motion filter, a correction value for the motion in the current video frame is computed. The at least one state variable is updated in the computation. In case the computed correction value exceeds a system constraint of the video stabilization system, the at least one state variable is adjusted in accordance with an extent by which the system constraint is exceeded. The correction value is then recomputed based on the motion estimate and on the adjusted state variable.

20 Claims, 9 Drawing Sheets

OTHER PUBLICATIONS

"Constraint Motion Filtering for Video Stabilization;" M. Tico et al; Image Processing, 2005; IEEE International Conference, Genova, Italy, Sep. 11-14, 2005; whole document.

"Constraint translational and rotational motion filtering for video stabilization;" T. Marius et al; Proceedings of the 13$^{th}$ European Signal Processing Conference; Sep. 4, 2005; whole document.

"Probabilistic video stabilization using Kalman filtering and mosaicking;" A. Litvin et al; Proceedings of the SPIE—The International Society for Optical Engineering SPIE-INT.; 2003; vol. 5022, pp. 663-674.

* cited by examiner

MOTION FILTERING FOR VIDEO STABILIZATION

FIELD OF THE INVENTION

The invention relates to video stabilization and more specifically to a motion filtering of a sequence of video frames which takes into consideration the practical constraints with respect to the amount of corrective motion that can be applied to each video frame.

BACKGROUND OF THE INVENTION

A sequence of video frames captured with a video camera may comprise desired motion, as in the case of a pan, but equally undesired motion. In the context of hand held video cameras, like camera phones, such unwanted motion fluctuations are typically caused by undesired shakes of the hand during video capturing. Especially at high zoom ratios, relatively small motion fluctuations, which are unavoidable when handling for instance a small camera phone, will result in very large displacements of the captured video frames.

The effects of unwanted motion fluctuations in the video data can be alleviated by means of a video stabilization system. As the effect of involuntary movements is increased at high zoom ratios, video stabilization is of particular importance for any device that is capable of more than 3× zoom. The ongoing development and miniaturization of consumer devices with video acquisition capabilities increases the need for robust and efficient video stabilization solutions.

Typically, video stabilization is achieved by applying a certain amount of a corrective motion displacement onto each video frame, in order to align it with respect to the neighborhood frames such that the effect of high frequency fluctuations, or jitter, caused by unwanted camera motions is cancelled.

A video stabilization operation applied by a video stabilization system generally comprises to this end a motion estimation, a motion filtering and a motion compensation.

The motion estimation is employed for determining the global displacement between consecutive frames of the video sequence. This global displacement is also referred to as raw motion and includes both desired and undesired motion.

Figure 1:
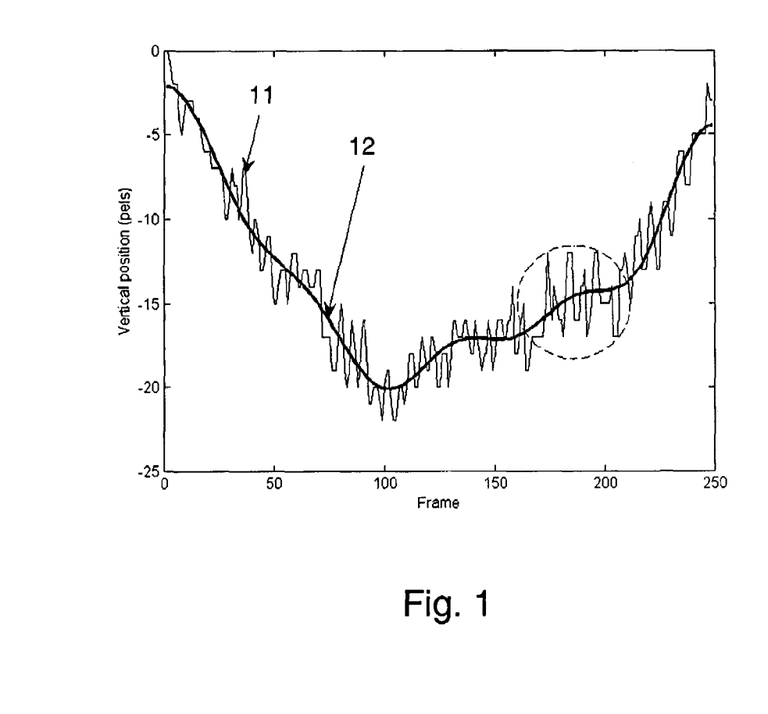
FIG. 1 is a diagram presenting unfiltered raw motion and filtered motion in a sequence of video frames.

The motion filtering is responsible for distinguishing between the intended and the unwanted components of the raw motion. Usually, the intended motion is smooth. Therefore, the desired motion trajectory can be determined by low-pass filtering the raw motion. FIG. 1 is a diagram depicting for illustration the vertical position of frames 0 to 250 of a sequence of video frames. A first curve 11 represents the vertical position of video frames resulting with an exemplary estimated raw motion, and a second curve 12 represents the vertical position of video frames resulting with the low pass filtered raw motion for these video frames.

Figure 2:
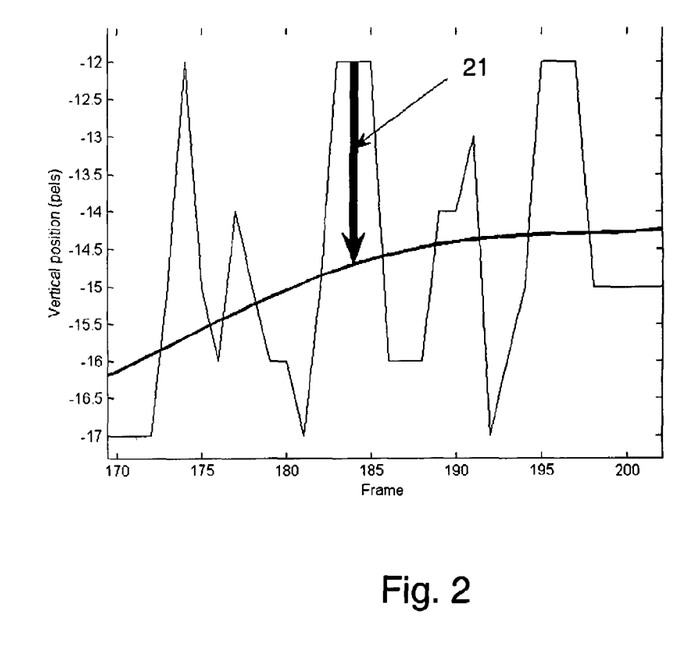
FIG. 2 is a diagram presenting a corrective vertical displacement for a selected video frame.

Once the intended motion has been estimated, the corrective displacement can be calculated, which has to be applied on a respective video frame in order to ensure that the difference between the raw motion and the intended motion is cancelled. It has to be noted that for real-time implementations, the filtering procedure must be causal. That is, the filtered motion sample of the current frame can only be calculated based on previous motion data, since no future information is available. FIG. 2 is a diagram depicting for illustration the vertical position of video frames in the neighborhood of video frame 184. Again, a first curve 11 represents the vertical position of video frames resulting with an exemplary estimated raw motion, and a second curve 12 represents the vertical position of video frames resulting with the low pass filtered raw motion. For video frame 184, moreover a corrective vertical displacement 21 is presented that must be applied to frame 184 for correcting the vertical position.

Figure 3:
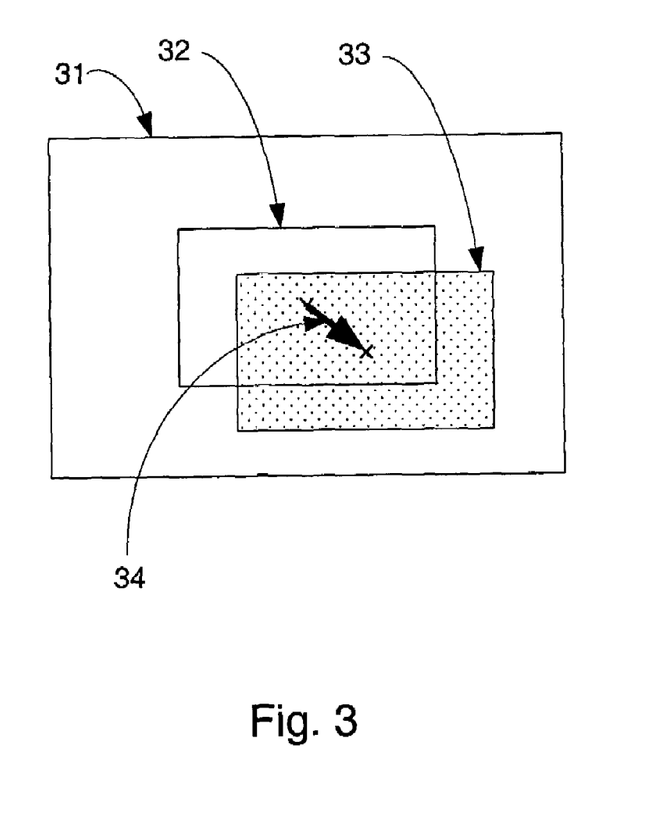
FIG. 3 is a diagram illustrating the stabilization of a video frame by a corrective displacement.

The motion correction is finally employed for changing the position of a respective video frame in accordance with the corrective displacement determined for this video frame in the motion filtering. One way to take care of this correction is to deliver a smaller frame size at the output of the stabilization system than at the input of the system, as exemplified in FIG. 3. FIG. 3 presents a larger input frame 31, which comprises the entire frame data captured by a camera sensor, and a smaller output frame 32 arranged in the center of the larger input frame 31. The output frame 32 is shifted to output frame 33 by the corrective displacement 34. The correction consists thus of cropping the larger input frame 31 to obtain an output frame 33 rectangle from a suitable position inside the larger input frame 31 that is determined by the corrective displacement 34.

A suitable motion estimation has been described for instance by S. Ertürk. in: "Digital image stabilization with sub-image phase correlation based global motion estimation", Consumer Electronics, IEEE Transactions on Volume 49, Issue 4, November 2003, Pages 1320-1325.

An exemplary motion filtering procedure will now be described in more detail by means of a mathematical formalism. In order to simplify the presentation, only a translation between adjacent frames is considered. The motion filtering operations are moreover applied independently for horizontal and vertical motions, such that the following formulas apply to either one of them.

The raw motion in the horizontal or vertical direction of the $n^{th}$ frame with respect to the first frame of an input sequence of video frames is denoted by $z_n$ and defined to be:

$$z_n = s_n + u_n, \quad (1)$$

where $s_n$ and $u_n$ stand for the intended and the unwanted components of the global frame position, respectively. For every frame n, a corrective displacement of $-u_n$ pixels is needed in order to stabilize the sequence of video frames.

As mentioned before, it is an important aspect for real-time implementations to filter the raw motion on-line based only on present and previous observations. Formally, this means that the current filtered motion $s_n$ is determined based only on the samples $z_n, z_{n-1}, \ldots, z_1$.

A simplification of the task can be achieved by assuming a certain model for the evolution of the filtered motion $s_n$. For example, a simple model assumes that the intended motion $s_n$ has a constant velocity $v_n$. This can be expressed by the following equations:

$$s_n = s_{n-1} + v_{n-1},$$

$$v_n = v_{n-1}, \quad (2)$$

which, expressed in matrix form, become $$x_n = A x_{n-1} \quad (3)$$

Here, $$x_n = \begin{bmatrix} s_n \\ v_n \end{bmatrix}$$

is the state of the process at time n, and $$A = \begin{bmatrix} 1 & 1 \\ 0 & 1 \end{bmatrix}$$

is the state transition matrix. Moreover, the observation equation (1) can be also expressed in matrix notations as follows:

$$z_n = c^t x_n + u_n, \quad (4)$$

where $$c = \begin{bmatrix} 1 \\ 0 \end{bmatrix}$$

is the observation matrix (vector) of size 2×1.

In more general terms, the state space representation of the frame displacement can be expressed as follows:

$$x_n = A x_{n-1} + b e_n$$

$$z_n = c^t x_n + u_n \quad (5)$$

where $e_n$ and $u_n$ are the process and measurement noise terms that are assumed to be zero mean Gaussian distributed with variances $\sigma_e^2$ and $\sigma_u^2$, respectively. The process matrix A has the size K×K, and the vectors c and b are of size K×1. The state $x_n$ is a K×1 vector from which the intended motion sn can be extracted through the operation $s_n = c^t x_n$.

Kalman filtering is an optimal solution for problems, in which a state transition and an observation equation in accordance with the model (5) are assumed. A Kalman filtering procedure that may be applied to stabilize video frame n is represented by the following algorithm:

Begin  (I)
1. $x_n = A x_{n-1}$
2. $P = A P A^t + \sigma_e^2 b b^t$
3. $g = P c (c^t P c + \sigma_u^2)^{-1}$
4. $P = P - g c^t P$
5. $x_n = x_n + g(z_n - c^t x_n)$
6. $u_n = z_n - c^t x_n$ End The algorithm receives as an input the estimated raw motion $z_n$ at frame n and provides as an output the amount of correction $-u_n$ that is to be applied to frame n. In addition to the parameters defined further above, the algorithm uses internal variables P and g. P is the K×K covariance matrix of the true state given the present and past observations and g is a K×1 vector called Kalman gain.

A corresponding Kalman filtering has been described for example by S. Erturk in: "Image sequence stabilisation based on Kalman filtering of frame positions", Electronics Letters, Volume 37, Issue 20, 27 Sep. 2001, Pages 1217-1219.

Figure 4:
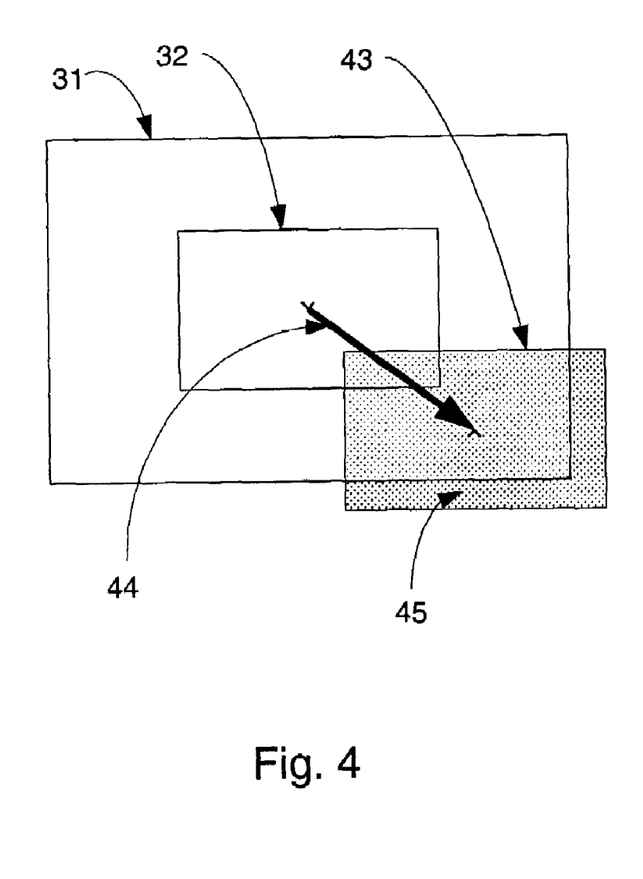
FIG. 4 is a diagram illustrating the stabilization of a video frame with a too large corrective displacement.

In practice, the amount of the corrective motion displacement $(-u_n)$ that can be applied to each video frame is constrained by the size difference between the input frame and the output frame of the stabilization system. A larger correction results in placing a part of the output frame outside the area of the input frame, as exemplified in FIG. 4. FIG. 4 shows again an input frame 31, an original output frame 32 and an output frame 43 shifted in accordance with a determined displacement vector 44. As the displacement vector 44 is too large, the stabilized output frame 43 comprises an undefined region 45. Such cases are especially frequent when using large zoom ratios.

In order to prevent such cases, it is necessary to implement a motion filtering procedure which is able to provide a filtered motion trajectory $s_n$, whose offset with respect to the raw motion $z_n$ is never exceeding a specified maximum corrective displacement d. An exemplary value for a maximum corrective displacement d could be 8 or 16 pixels.

In other words, the filtering problem can be formulated as to determine a smooth trajectory for the intended motion component $S_n$, under the constraint that for any frame n:

$$|u_n| \leq d \quad (6)$$

Also in the above cited document "Digital image stabilization with sub-image phase correlation based global motion estimation" it has been pointed out that in sequences that contain deliberate movements, the system is likely to reach the limit of permitted frame shifts rather rapidly, in which case the stabilization performance is degraded to keep the image content within the visible frame.

The system constraint on the amount of corrective motion may be handled by simply limiting the corrective motion that is applied on each video frame. That is, whenever the amount of corrective displacement exceeds the maximum value allowed by the system, the current frame will not be displaced more than the specified maximum displacement. In terms and notations used in the above presented algorithm (I), this can be achieved by adding two new lines to algorithm (I) as follows:

Begin
    Lines 1 to 6 from Algorithm (I)
    7. if $|u_n| > d$ then
    8. $u_n = \text{sign}(u_n) \cdot d$  (II)

End

In this algorithm (II), the notation sign(•) stands for the sign function.

Indeed, this solution ensures that the video stabilization system will not apply any corrections that may shift the stabilized frame outside of the area of the input frame. However, as indicated above, the smoothness of the resulting filtered motion trajectory is sacrificed by the simple limitation, resulting in a jumpy output.

Figure 5:
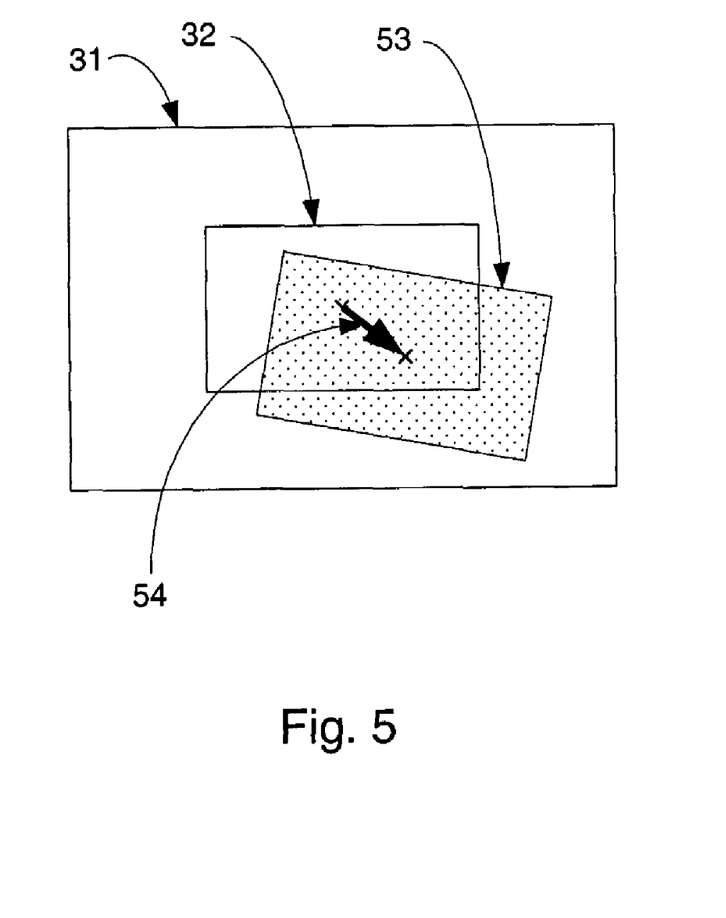
FIG. 5 is a diagram illustrating the stabilization of a video frame by a corrective translation and rotation.

Most of the current video stabilization systems correct only for unwanted translational motion. It has to be noted, however, that the stabilized video data delivered by such systems is often still containing a disturbing rotational jitter. Therefore, video stabilization systems advantageously remove as well the rotational jitter in the video frames, as exemplified in FIG. 5. FIG. 5 presents a larger input frame 31, which comprises the entire frame data captured by a camera sensor, and a smaller output frame 32 arranged in the center of the larger input frame 31. The output frame 32 is shifted by the corrective displacement 54 and rotated in addition by a corrective rotation, resulting in output frame 53. The correction consists thus again of cropping the larger input frame 31 to obtain an output frame 53 rectangle from a suitable position inside the larger input frame 31 that is determined by the corrective motion.

A Kalman filtering based stabilization, in which video frames are shifted and rotated by corresponding correction parameters so as to obtain a stabilized sequence, has been presented for example by S. Etürk in: "Translation, rotation and scale stabilization of image sequences", Electronics Letters, Volume 39, Issue 17, 21 August 2003, Page(s):1245-1246.

Figure 6:
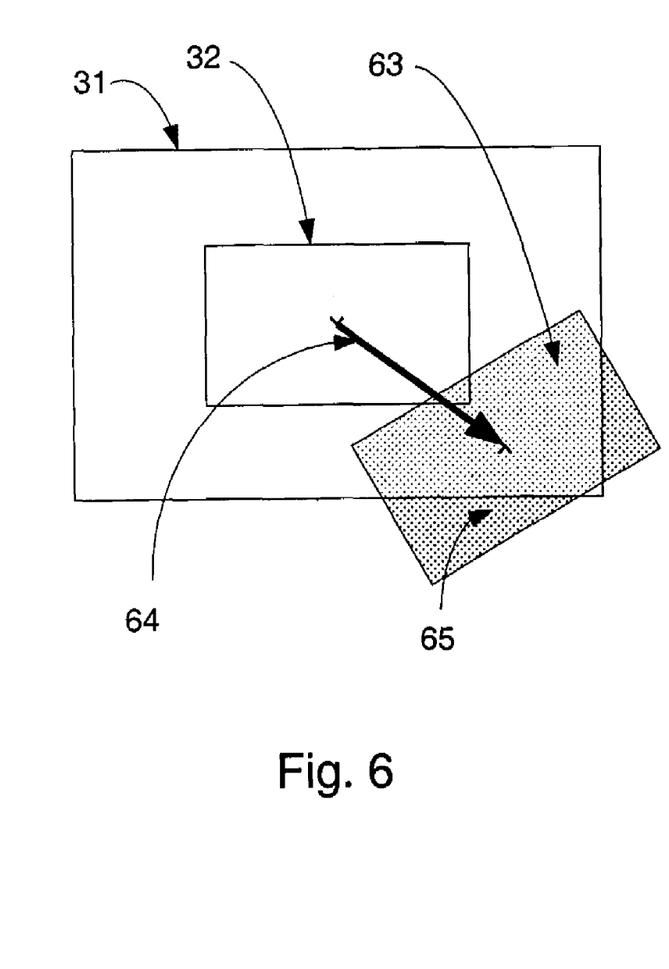
FIG. 6 is a diagram illustrating the stabilization of a frame by a too large corrective translation and rotation.

The system constraints on the amount of corrective motion may be treated also in this case simply by limiting the corrective motion applied on each video frame with fixed values. However, in this case, the smoothness of the resulted filtered motion trajectory is sacrificed particularly fast, as illustrated in FIG. 6. FIG. 6 shows again an input frame 31, an original output frame 32 and a rotated and shifted output frame 63, the displacement corresponding to a displacement vector 64. Due to the rotation, an undefined region 65 is obtained earlier than with a pure corrective translation.

It has to be noted that other system constraints may have to be considered as well.

SUMMARY OF THE INVENTION

It is an object of the invention to provide an improved video stabilization for situations in which a system constraint becomes relevant.

A method for applying a motion filter of a video stabilization system to a sequence of video frames is proposed. The proposed method comprises for a current video frame receiving an estimate of a motion in the current video frame compared to a first video frame of the sequence of video frames. The proposed method further comprises computing a correction value for the motion in the current video frame based on the motion estimate and on at least one state variable of the motion filter, wherein the at least one state variable is updated in the computation. The proposed method further comprises in case the computed correction value exceeds a system constraint of the video stabilization system, adjusting the at least one state variable in accordance with an extent by which the system constraint is exceeded and recomputing the correction value based on the motion estimate and on the adjusted state variable.

Moreover, a video stabilization system including a motion filter is proposed. The motion filter comprises a processing portion adapted to receive an estimate of a motion in a current video frame compared to a first video frame of a sequence of video frames and to compute a correction value for the motion in the current video frame based on the motion estimate and on at least one state variable of the motion filter, wherein the at least one state variable is updated in the computation. The motion filter further comprises a processing portion adapted to adjust the at least one state variable, in case the computed correction value exceeds a system constraint of the video stabilization system, in accordance with an extent by which the system constraint is exceeded and to recompute a computed correction value based on the motion estimate and on the adjusted state variable.

The processing portions can be realized in hardware, in software or by a combination of both. In the latter case, they could be realized for example by a software code and a processor executing the software code.

The video stabilization system could be integrated for example in a video processing chipset including at least one chip. Further, it could be a part of a camera module that comprises in addition a video recording component.

Moreover, an electronic device comprising a video stabilization system with a motion filter is proposed. The motion filter includes the same processing portions as the motion filter of the proposed video stabilization system.

The electronic device can be for example a mobile electronic device, like a mobile phone, which itself comprises a video recording component for capturing the sequence of video frames. It is to be understood, however, that the electronic device does not have to itself comprise a video recording component. It could equally be a mobile electronic device or a stationary electronic device that is able to receive and process a sequence of video frames captured by another device.

Finally, a software program product is proposed, in which a software code for applying a motion filter of a video stabilization system to a sequence of video frames is stored. When executed by a processor of an electronic device, the software code realizes the proposed method. The software program product may be for example a separate storing device, like a CD-ROM. Alternatively, it may be integrated, for example, into a more comprehensive electronic device comprising a processor that is adapted to execute the software code.

The invention proceeds from the consideration that a smooth motion trajectory in a sequence of video frames can be achieved even in the presence of a system constraint, if a limitation of a stabilizing correction value for a current video frame due to the system constraint can be taken into account in the computation of a stabilizing correction value for the subsequent video frame. It is therefore proposed that the limitation of a correction value for a current frame is reflected in the state variables of the motion filter. This enables a consideration of the limitation in the correction computations for the subsequent video frame. Thus, whenever an amount of a motion correction determined for one video frame exceeds the maximum value allowed by the system, the filter state may be changed such that a smooth motion trajectory is maintained by adjusting the future values of a correction accordingly.

It is an advantage of the invention that it allows obtaining a smooth stabilized motion trajectory without introducing an undefined region in any output video frame.

The invention is of particular advantage for those cases in which the amplitude of the unwanted motion fluctuations is comparable with the maximum amount of a motion correction that is allowed by the video stabilization system. Such cases are given, for example, if the sequence of video frames is captured using high zoom ratios and/or large image resolutions. While the conventional approach respects the system constraint by sacrificing the stability of the motion, the invention allows stabilizing the motion even in such cases.

It is to be understood that the proposed video stabilization system could include in addition to the motion filter a conventional motion estimator for determining the motion estimate and a conventional motion corrector for correcting a motion in a respective video frame based on a correction value computed or recomputed by the motion filter.

The system constraint limits the maximum amount of a motion correction that can be applied to each video frame. In one embodiment of the invention, the system constraint is related to a difference between the size of video frames input to the video stabilization system and the size of video frames output by the video stabilization system.

In a further embodiment of the invention, computing a correction value for the motion in the current video frame comprises using a Kalman filter. The at least one state variable may then be a state variable of the Kalman filter. The invention may thus be implemented by extending the normal Kalman filtering procedure to a "Constraint Kalman Filtering" by incorporating the system constraint in an optimal manner.

The at least one state variable which is adjusted in accordance with the invention may comprise for example a variable representing the intended motion in the current video frame and a variable representing an assumed velocity of the intended motion. In the case of a constraint Kalman filtering, for example, the at least one state variable may comprise all elements of the state vector of a Kalman filter.

The invention can be employed for the correction of various types of unintended motion. In general, the motion correction will be desired at least for a horizontal and a vertical translation. As indicated above, however, a compensation for rotational jitter may also be of importance.

When taking into consideration only an unintended translational motion, the system constraint on a corrective motion is the same for every video frame. It can thus be represented by a fixed maximum correction value. The horizontal and vertical translations can be treated separately, since they are independent of each other. If the rotational jitter is also considered, then the determination of the system constraints that are required to keep the rotated and translated output frame within the input frame area is more complex.

In one embodiment of the invention, therefore three filtering procedures according to the invention are applied to a respective video frame, where the filtering procedures are interrelated to each other in accordance with the geometrical interdependence between the translational and rotational motion corrections. That is, a correction value is computed and, if required, recomputed in sequence for a rotation and for a translation in horizontal and vertical direction, the system constraint for the translations being determined as a function of a correction value resulting for the rotation. The rotational correction, which is applied first, changes the amount of maximum horizontal and vertical corrective translations that could be applied thereafter. In general, the higher the rotational correction the smaller the remaining amount of horizontal and vertical corrections that may be applied. Consequently, the system constraints are even more critical in this case than in the case when only translational motion is considered. This embodiment has the advantage of providing a smooth stabilized motion trajectory even in the presence of the system constraints with respect to the amount of rotational and translational corrective motion allowed for each frame. It has to be noted that, alternatively, also the correction values for the translation could be determined first. The system constraint for the rotation could then be determined as a function of the correction values for the translations.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 7:
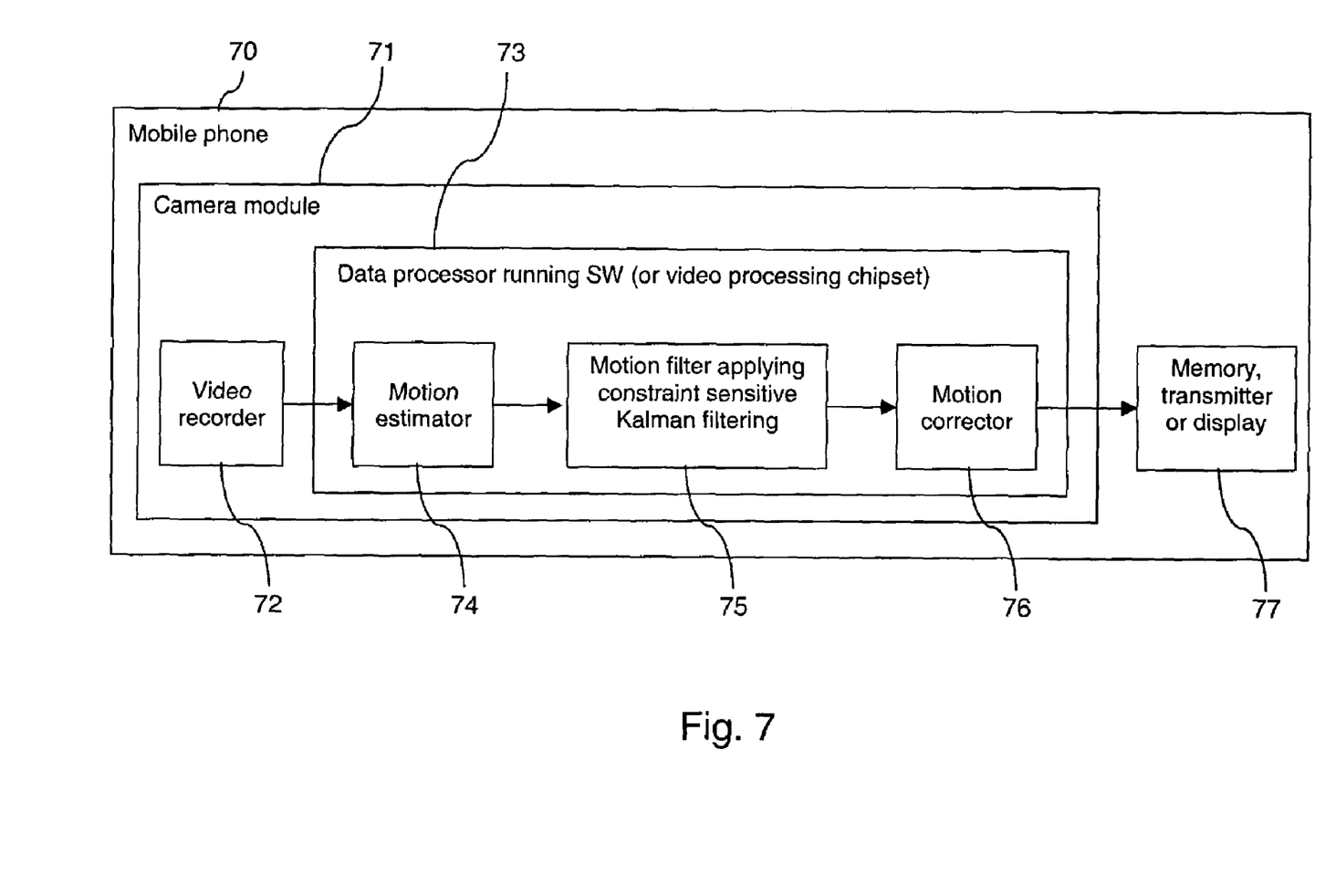
FIG. 7 is a schematic block diagram of mobile device in accordance with an embodiment of the invention.

FIG. 7 is a schematic block diagram of a mobile device enabling a video stabilization in accordance with the invention. By way of example, the mobile device is a mobile phone 70.

The mobile phone 70 comprises a camera module 71 with a conventional video recorder 72. The camera module 71 further includes a data processor 73 adapted to execute various implemented software program components. The implemented software program components comprise components realizing a video stabilization system, namely a motion estimator component 74, a motion filter component 75 and a motion corrector component 76. It is to be understood that the data processor 73 is not required to form a part of the camera module 71. It could equally be, for instance, a general data processor of the mobile phone 70, which is able to execute software program components for various applications. It is further to be understood that the functions realized by the motion estimator component 74, the motion filter component 75 and the motion corrector component 76 could also be implemented in a video processing chipset. The mobile phone 70 moreover comprises a memory, a transmitter and a display, summarized in FIG. 7 by a block 77.

The mobile phone 70 includes in addition a variety of other elements not shown, which may be designed and arranged in the mobile phone 70 in a conventional manner.

Also the video recorder 72, the motion estimator component 74, the motion corrector component 76 and the memory, transmitter and display 77 may be designed and arranged in a conventional manner.

The motion filter component 75, however, is designed in accordance with the invention.

Figure 8:
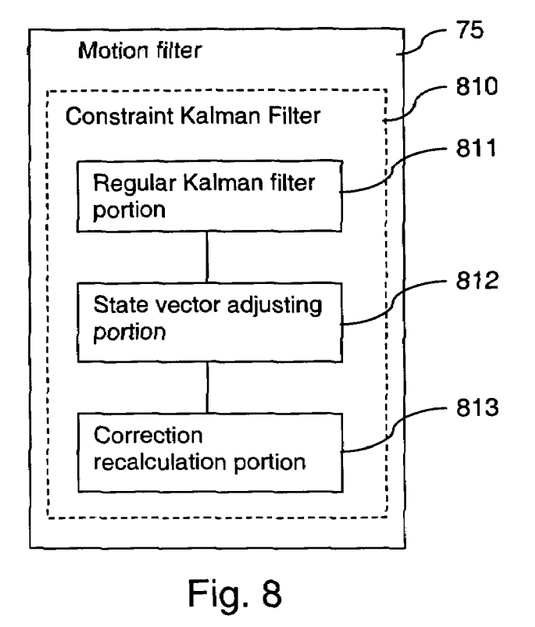
FIG. 8 is a schematic block diagram of a first embodiment of a motion filter in the device of FIG. 7.

A first possible embodiment of the motion filter component 75 is illustrated in more detail in FIG. 8.

In this embodiment, the motion filter component 75 comprises a constraint Kalman filter 810. The constraint Kalman filter 810 includes a regular Kalman filter portion 811, a state vector adjusting portion 812 and a correction recalculation portion 813.

Figure 9:
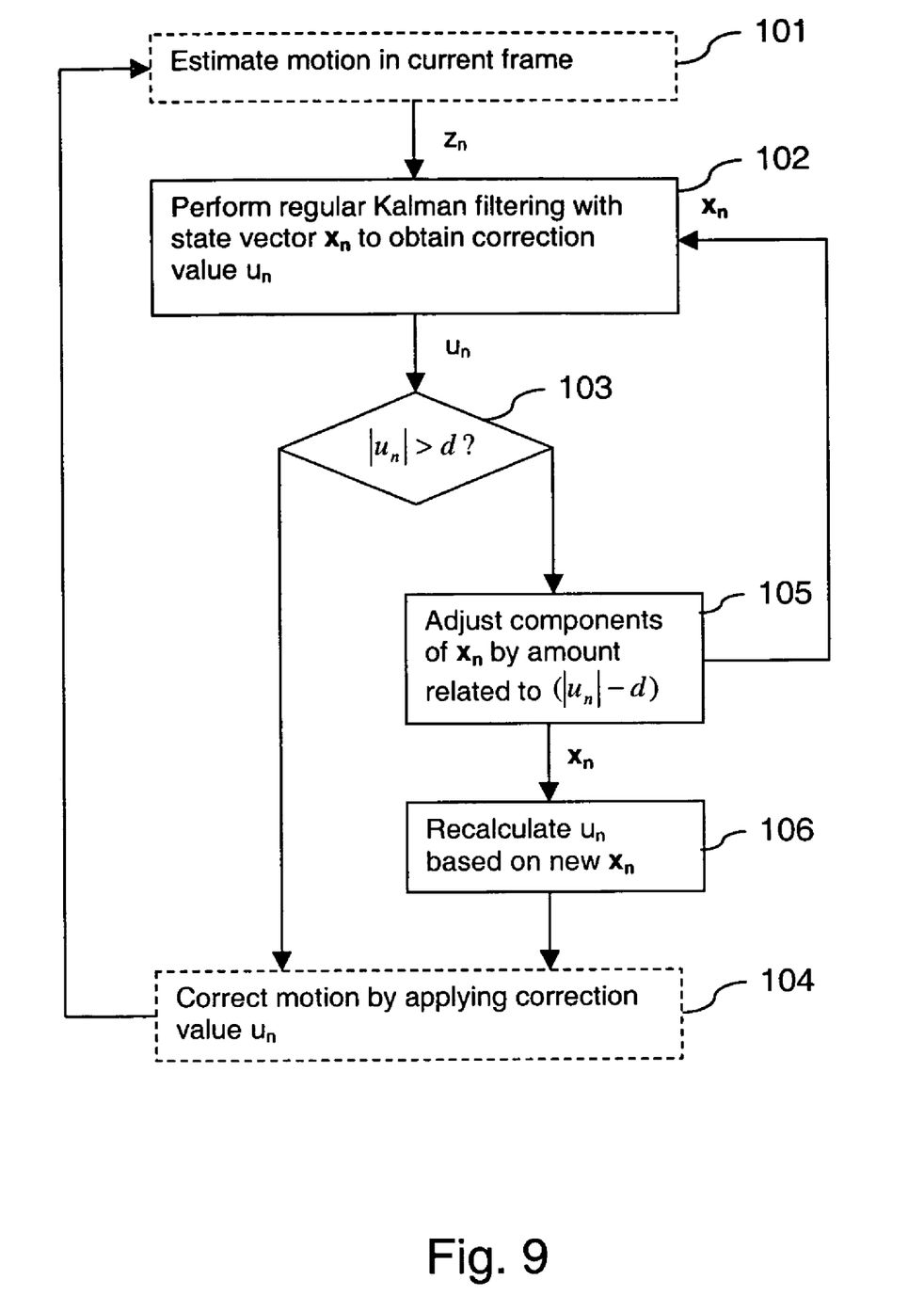
FIG. 9 is a flow chart illustrating the operation of the motion filter of FIG. 8.

The operation of the motion filter component 75 of FIG. 8 will now be described with reference to the flow chart of FIG. 9. All steps carried out by other components than the motion filter component 75 are indicated by blocks that are drawn with dashed lines.

A user of the mobile phone 70 may capture a video by using the integrated video recorder 72 of the camera module 71 in a conventional way. In addition to the intended motion of the mobile phone 70 and thus of the video recorder 72 during the capturing, some unintentional motion will occur. The data processor 73 therefore takes care of removing the unintentional motion by executing the motion estimator component 74, the motion filter component 75 and the motion corrector component 76.

The motion estimator component 74 determines the raw motion in the recorded video frames, that is, the intended motion plus the unintended motion, in a conventional manner (step 101). The estimated raw motion $z_n$ for a respective video frame n is then provided to the motion filter component 75.

The regular Kalman filter portion 811 of the constraint Kalman filter 810 applies a regular Kalman filtering to the received raw motion $Z_n$ to obtain a correction value $u_n$ (step 102). In the Kalman filtering, a state vector $x_c$ of the size K×1 is used, which proceeds from the state vector $x_{n-1}$ resulting in the Kalman filtering of the estimated raw motion $z_{n-1}$ in the preceding video frame n−1.

The state vector adjusting portion 812 of the constraint Kalman filter 810 compares thereupon the determined correction value $u_n$ with an allowed correction value d (step 103).

If the absolute value of the determined correction value $u_n$ does not exceed the allowed correction value d, the determined correction value $u_n$ is provided immediately to the motion corrector component 76, which corrects the raw motion in the current video frame with the determined correction value $u_n$ (step 104). So far, the processing may correspond to a conventional motion filtering.

If the absolute value of the determined correction value $u_n$ exceeds the allowed correction value d, however, the processing differs from a conventional motion filtering.

In this case, all elements of the state vector $x_n$ are adjusted by an amount that is related to the difference between the absolute value of the determined correction value $u_n$ and the allowed correction value d (step 105).

The correction value $u_n$ is then recalculated based on the new state vector $x_n$ (step 106).

Only then, the correction value $u_n$ is provided to the motion corrector component 76, which corrects the raw motion $z_n$ in the current video frame n with the recalculated correction value $u_n$ (step 104).

In the subsequent regular Kalman filtering of the raw motion $z_{n+1}$ estimated and provided for the subsequent video frame n+1 (step 102), the adjusted state vector $x_n$ is used as the basis for the new state vector $x_{n+1}$.

The presented constraint Kalman filter 810 may be provided for example for horizontal motion, while the same constraint Kalman filter 810 may be provided in parallel for vertical motion.

The constraint Kalman filtering applied to stabilize frame n can be implemented for example with the following algorithm for each direction:

Begin (III)

1. $x_n = A x_{n-1}$
2. $P = APA^t + \sigma_e^2 bb^t$
3. $g = Pc(c^t Pc + \sigma_u^2)^{-1}$
4. $P = P - gc^t P$
5. $x_n = x_n + g(z_n - c^t x_n)$
6. $u_n = z_n - c^t x_n$
7. if $|u_n| > d$ then
8. $x_n = x_n + \text{sign}(u_n)(|u_n| - d)Pc(c^t Pc)^{-1}$
9. $u_n = z_n - c^t x_n$ End This algorithm (III) receives as an input the estimated global displacement $z_n$ between the $n^{th}$ frame and the $1^{st}$ frame and in addition the constraint d on a corrective motion amplitude. It outputs the amount of a corrective displacement $u_n$ that is to be applied on current frame n for stabilization. All employed variables correspond to those of the respective same naming introduced in the background section for algorithm (I).

It can be seen that algorithm (III) corresponds to algorithm (I) presented above, except for lines 8 and 9.

The new state update equation in line 8 has the effect of correcting all elements of state vector $x_n$ every time there is an attempt to exceed the system constraint. The corrected state vector $x_n$ is then used according to line 9 for determining the final corrective displacement $u_n$. The state update equation ensures that the new state will be the most probable state in view of the present and previous observation, while respecting the imposed system constraint.

For example, in case the state vector $x_n$ has a size of K×1=2×1 and comprises as elements the smoothed motion $s_n$ and the velocity $v_n$, the system constraint acts only on the first element of the state $s_n$, which cannot have values outside the interval $[z_n-d, z_n+d]$. The state update equation in line 8 will change not only the first element $s_n$ of the state vector $x_n$, but also the velocity $v_n$ to adjust it in accordance with the system constraint. The change of the velocity $v_n$ will only have an effect on the motion filtering of the subsequent frame.

Figure 10:
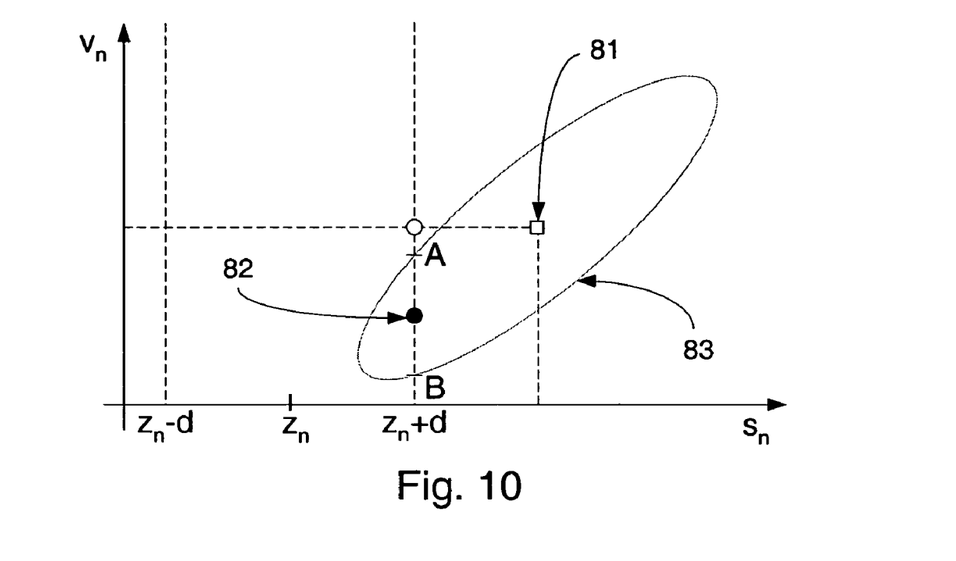
FIG. 10 is a diagram illustrating a corrective translation determined by the motion filter of FIG. 8.
Figure 11:
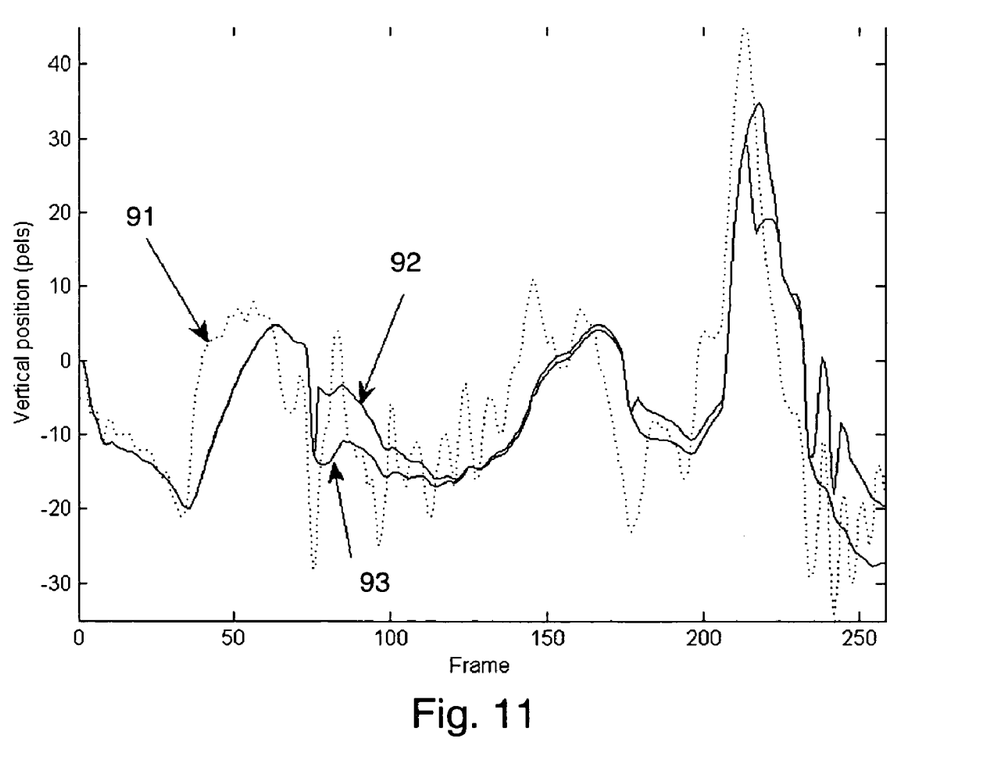
FIG. 11 is a diagram presenting unfiltered raw motion, conventionally filtered motion and filtered motion resulting with the motion filter of FIG. 8.

The effect of this approach is illustrated in FIGS. 10 and 11.

FIG. 10 is a diagram illustrating the effect of the proposed state update equation in line 8 of algorithm (III) in a two-dimensional state space, the x-axis representing the state $s_n$ and the y-axis the velocity $v_n$ of state vector $x_n$. On the x-axis, the raw motion $z_n$ is indicated and the constraints on a motion correction $z_n-d$ and $z_n+d$.

The filtered motion $s_n$ resulting in the regular Kalman filtering, and thus at line 5 of algorithm (III), is assumed to exceed the system constraint. The associated state vector $x_n$ is located at point 81. In a conventional approach, only the correction value $u_n$ is adjusted, the state vector $x_n$ remains located at point 81. The state vector $x_n$ that is obtained at line 8 of algorithm (III), in contrast, is located at point 82. The probability of the true state given all observations is a Gaussian bell that is illustrated in FIG. 10 by a constant contour ellipse 83. The solution at point 82 provided by the proposed method lies in the middle of a segment AB, where A and B are the intersection between the constant contour ellipse and a vertical at $z_n+d$. This is exactly the point in the state space which achieves the maximum probability under the imposed system constraint.

The diagram of FIG. 11 exemplifies the effect of the proposed approach when applied to stabilize the vertical displacement of a certain test video sequence assuming a system constraint of d=16 pixels. The diagram presents again the vertical position for a sequence of video frames. A first curve 91 represents the original motion trajectory, that is, the raw motion trajectory. A second curve 92 represents the filtered trajectory obtained with the conventional adjustment to the system constraint. Finally, a third curve 93 represents the filtered trajectory obtained with the proposed motion filtering. The trajectories 92 and 93 differ from each other whenever the system constraint is challenged. In such a case, the conventional solution 92 reduces the stabilization performance in order to fulfill the system constraint, whereas the proposed filtering 93 maintains a smooth trajectory while keeping account of the system constraint as well.

It is to be understood that the above presented algorithm (III) for a constraint Kalman filtering can be adapted to a respective situation by adjusting one or more of the parameters in the algorithm. The respective values of these parameters may be provided as further input data to the algorithm. It has been proposed for example by M. K. Gullu, E. Yaman and S. Erturk in: "Image sequence stabilisation using fuzzy adaptive Kalman filtering", Electronics Letters, Volume 39, Issue 5, 6 Mar. 2003, Pages 429-431, to adapt the process noise variance to the motion characteristics of the camera to ensure that a good stabilization performance is achieved for low-frequency as well as for high frequency jitter.

By modifying the parameters of the Kalman filter, like the process and observation noise variances, it is possible to achieve filtered motion trajectories that are, on average, closer or further away from the estimated raw motion, thereby requiring smaller or larger corrective displacements, respectively. Typically, the larger the average corrective displacements the smoother the stabilized motion trajectory, but also the higher the risk to exceed the system constraints. In a conventional approach, there is no guarantee that the system constraints will not be exceeded during filtering. If this happens, then the result will be poor as long as the correction value determined by the motion filtering is simply truncated by the system. In the presented embodiment, in contrast, exactly these situations are overcome. Thus, whenever the system constraints are exceeded, the filter state is changed in order to redirect the motion trajectory towards a smoother path inside the allowed constraints.

Figure 12:
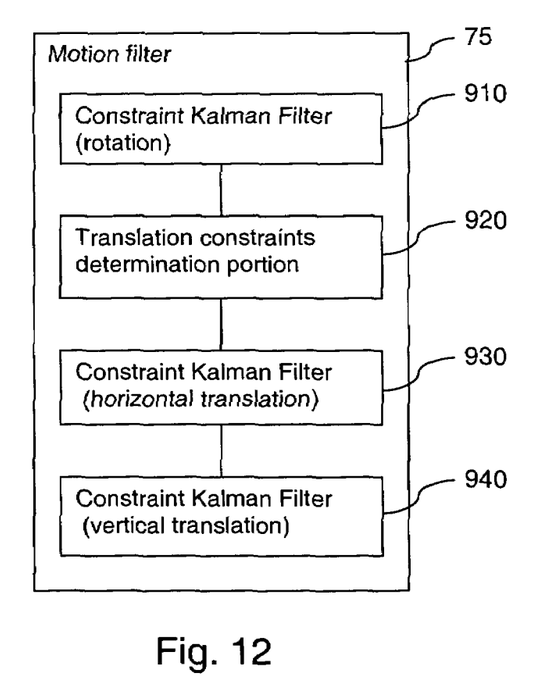
FIG. 12 is a schematic block diagram of a second embodiment of a motion filter in the device of FIG. 7.

A second possible embodiment of the motion filter component 75 of the mobile phone 70 of FIG. 7 is illustrated in more detail in FIG. 12.

In the second embodiment, the motion filter component 75 comprises a first constraint Kalman filter 910 for a rotation compensation, a translation constraints determination portion 920, a second constraint Kalman filter 930 for a horizontal translation compensation and a third constraint Kalman filter 940 for a vertical translation compensation. Each of the constraint Kalman filters 910, 930, 940 can be realized and operate basically like the constraint Kalman filter 810 of FIG. 8.

The operation of the motion filter component 75 of FIG. 12 will now be described with reference to the flow chart of FIG. 13 and the diagrams of FIGS. 14 and 15. All steps carried out by other components than the motion filter component 75 are indicated by blocks that are drawn with dashed lines.

A user of the mobile phone 70 may capture a video by using the integrated video recorder 72 of the camera module 71 in a conventional way. In addition to the intended motion of the mobile phone 70 and thus of the video recorder 72 during the capturing, some unintentional motion will occur. The data processor 73 therefore takes care of removing the unintentional motion by executing the motion estimator component 74, the motion filter component 75 and the motion corrector component 76. In this case, however, not only a corrective translation, but equally a corrective rotation is applied.

The motion estimator component 74 determines the raw motion in the recorded video frames, that is, the intended motion plus the unintended motion, in a conventional manner (step 201). The estimated raw motion for a respective video frame n, including rotation, horizontal translation and vertical translation, is then provided to the motion filter component 75.

The constraint Kalman filter portion 910 applies a constraint Kalman filtering as described with reference to FIG. 9 (step 202). Here, an estimated raw rotation is used as the input $z_n$. The output $u_n$ is a corrective rotation value $\theta_n^c$. The system constraint d in the constraint Kalman filtering of FIG. 9 is given by a predetermined maximum rotation $\theta \in [-\Theta, \Theta]$ that may be applied in the rotation correction. For illustration, FIG. 14 presents an input frame 301 and an output frame 302. Further, it shows the maximum rotation $\Theta$ that could be applied to the input frame 301 while maintaining the output frame 302 inside the visual area defined by the rotated input frame 303. The maximum rotational angle $\Theta$ is the same at all frames. It depends only on the size difference between the input frames 301 and the output frames 302, and is thus predetermined for each stabilization system.

Figure 15:
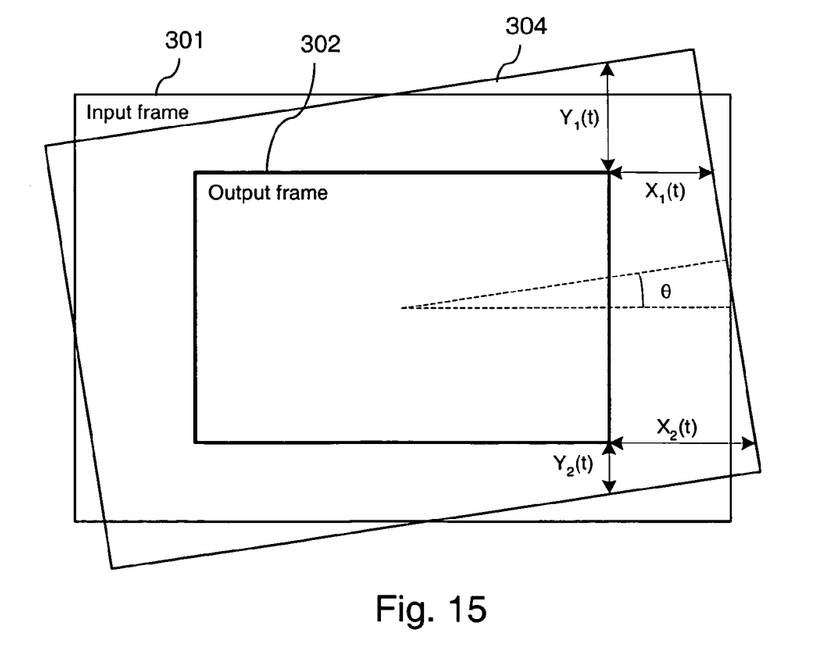
FIG. 15 is a diagram showing the system constraints for a corrective translation after an applied corrective rotation.

While the rotational constraint is fixed and independent of the translational corrections, the translational constraints depend on the determined rotational correction, as illustrated in FIG. 15. FIG. 15 shows again an input frame 301 and an output frame 302. Further, it shows an input frame 304 which is rotated by a determined rotational correction θ. As can be seen, the maximum horizontal translation that may still be applied without moving the output frame out of the rotated input frame is $X(\theta)=\min\{X_1(\theta),X_2(\theta)\}$, and the maximum vertical translation that may still be applied without moving the output frame out of the rotated input frame is $Y(\theta)=\min\{Y_1(\theta),Y_2(\theta)\}$.

The translation constraints determination portion 920 thus calculates the maximum acceptable translational constraints as a function of the determined rotational correction θ (step 203) and provides the result to the second and third constraint Kalman filter portions 930, 940.

The second constraint Kalman filter portion 930 performs as well a constraint Kalman filtering as described with reference to FIG. 9 (step 204). Here, the estimated horizontal raw motion is used as the input $z_n$. The system constraint d in the constraint Kalman filtering of FIG. 9 is given by the determined maximum horizontal translation $X(\theta)$ that may still be applied. The output $u_n$ is a corrective horizontal translation value.

Also the third constraint Kalman filter portion 940 performs a constraint Kalman filtering as described with reference to FIG. 9 (step 205). Here, the estimated vertical raw motion is used as the input $z_n$. The system constraint d in the constraint Kalman filtering of FIG. 9 is given by the determined maximum vertical translation $Y(\theta)$ that may still be applied. The output $u_n$ is a corrective vertical translation value.

The determined rotational correction value θ, the determined corrective horizontal translation value and the determined corrective vertical translation value are provided to the motion correction component 76, which corrects the raw motion in the current video frame with each of the determined correction values (step 206).

Figure 13:
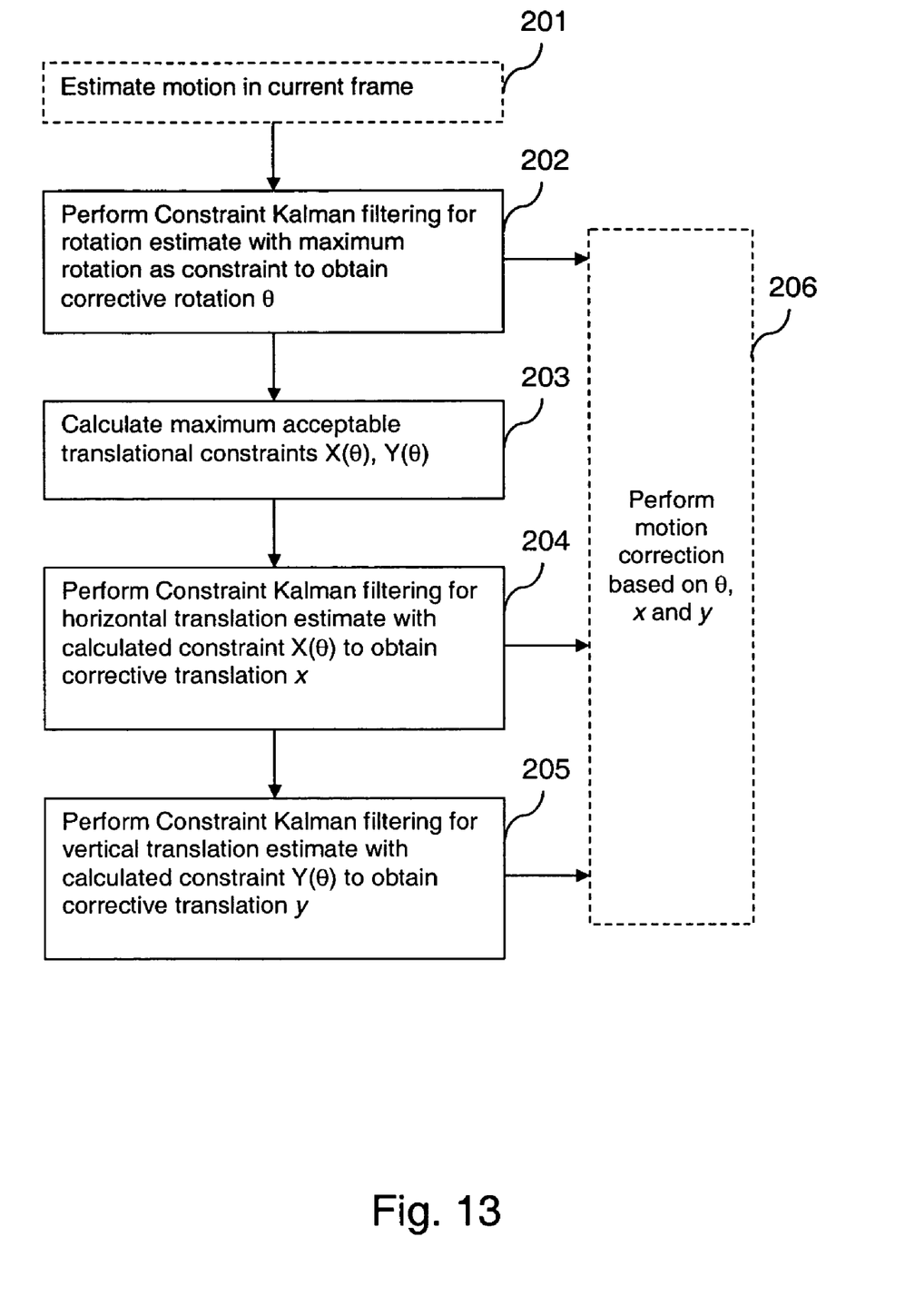
FIG. 13 is a flow chart illustrating the operation of the motion filter of FIG. 12.
Figure 14:
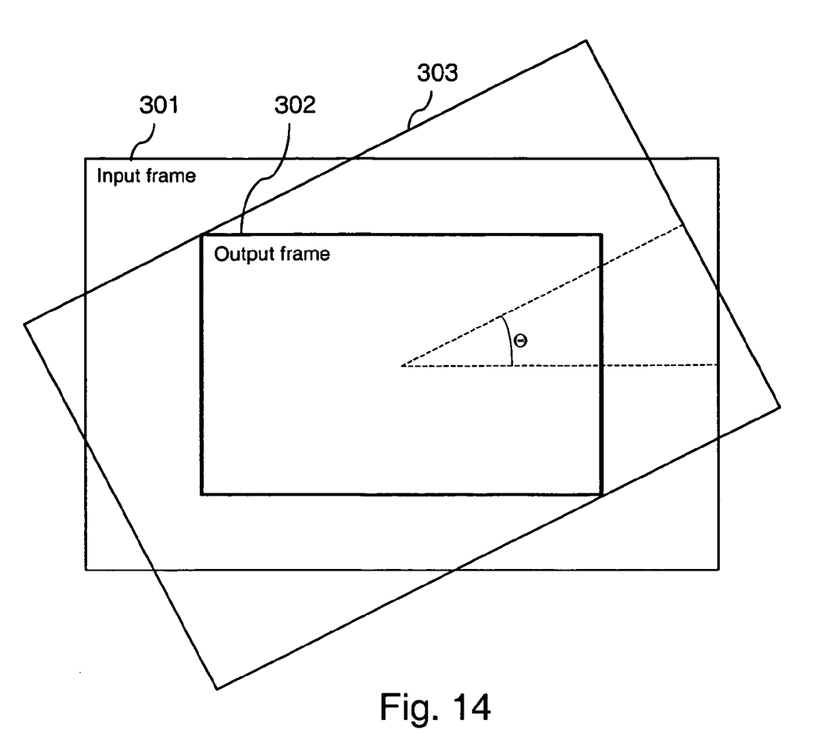
FIG. 14 is a diagram showing the system constraints for a corrective rotation by the motion filter of FIG. 12.

The sequence of constraint Kalman filtering procedures which are applied to estimated raw motion in accordance with FIG. 13 can be implemented for example with the following algorithm:

Begin

1. $\theta_n^c = CKF1(\theta_n^e, \Theta)$

2. Calculate the maximum acceptable translational constraints $X(\theta_n^c)$, and $Y(\theta_n^c)$.

3. $x_n^c = CKF2(x_n^e, x(\theta_n^c))$

4. $y_n^c = CKF3(y_n^e, Y(\theta_n^c))$ (IV)

End

In this algorithm (IV), the functions CKF1, CKF2 and CKF3 stand for a respective constraint Kalman filtering algorithm, like the above presented constraint Kalman filtering algorithm (III). Algorithm (IV) receives as input values the three motion parameters estimating the global displacement between the $n^{th}$ video frame and the first video frame of a video sequence, namely the estimated raw translation $x_n^e$ along the horizontal axis, the estimated raw translation $y_n^e$ along the vertical axis, and the estimated raw rotation $\theta_n^e$ around the optical axis of the camera, that is, the image center.

Further, it receives as an input value the maximum rotational correction $\Theta$ that is allowed in view of input frame size and output frame size of the stabilization system. Algorithm (IV) outputs the rotational and translational correction values, namely the corrective translation along the horizontal axis $x_n^c$, the corrective translation along the vertical axis $y_n^c$ and the corrective rotation around the image center $\theta_n^c$.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for applying a motion filter of a video stabilization system to a sequence of video frames, said method comprising for a current video frame: a processor or processors to perform the following:
    receiving an estimate of a motion in said current video frame compared to a first video frame of said sequence of video frames;
    computing a correction value for said motion in said current video frame based on said motion estimate and on at least one state variable of said motion filter, wherein said at least one state variable is updated in said computation;
    in case said computed correction value exceeds a system constraint of said video stabilization system, adjusting said at least one state variable in accordance with an extent by which said system constraint is exceeded and recomputing said correction value based on said motion estimate and on said adjusted state variable.

2. The method according to claim 1, wherein said system constraint is related to a difference between a size of video frames input to said video stabilization system and a size of video frames output by said video stabilization system.

3. The method according to claim 1, wherein said computing of a correction value for said motion in said current video frame comprises using an extended Kalman filter and wherein said at least one state variable is a state variable of said extended Kalman filter, said extended Kalman filter being extended in that it implements the adjusting of said at least one state variable and the recomputing of said correction value.

4. The method according to claim 1, wherein said at least one state variable comprises a variable representing an intended motion in said current video frame and a variable representing an assumed velocity of said intended motion.

5. The method according to claim 1, wherein said motion is at least one of a horizontal translation, a vertical translation and a rotation.

6. The method according to claim 5, wherein said correction value is computed and, if required, recomputed in sequence for a rotation and for a translation in horizontal and vertical direction, and wherein a system constraint for at least one of said types of motion is determined as a function of a correction value resulting for at least one other of said types of motion.

7. An apparatus comprising a video stabilization system including a motion filter, said motion filter comprising:
    a processor configured to receive an estimate of a motion in a current video frame compared to a first video frame of a sequence of video frames and to compute a correction value for said motion in said current video frame based on said motion estimate and on at least one state variable of said motion filter, wherein said at least one state variable is updated in said computation; and
    configured to adjust said at least one state variable, in case said computed correction value exceeds a system constraint of said video stabilization system, in accordance with an extent by which said system constraint is exceeded and to recompute a computed correction value based on said motion estimate and on said adjusted state variable.

8. The apparatus according to claim 7, wherein said processor configured to adjust said at least one state variable is configured to adjust a variable representing an intended motion in said current video frame and a variable representing an assumed velocity of said intended motion.

9. The apparatus according to claim 7, wherein said motion is at least one of a horizontal translation, a vertical translation and a rotation, wherein said processor is configured to compute and, if required, recompute a correction value in sequence for a rotation and for a translation in horizontal and vertical direction, and wherein said processor is configured to determine a system constraint for at least one of said types of motion as a function of a correction value resulting for at least one other of said types of motion.

10. The apparatus according to claim 7, further including a motion estimator configured to determine said motion estimate and a motion corrector configured to correct a motion in a respective video frame based on a correction value computed or recomputed by said motion filter.

11. The apparatus according to claim 7, wherein said electronic device comprises a video processing chipset including at least one chip, said video stabilization system being integrated in said chipset.

12. The apparatus according to claim 7, wherein said apparatus is one of a camera module and a mobile electronic device.

13. The apparatus according to claim 7, further comprising a video recording component configured to capture a sequence of video frames.

14. A data processor readable medium embodied with software code for applying a motion filter of a video stabilization system to a sequence of video frames is stored, said software code realizing the following steps-when being executed by a data processor of an electronic device:
    receiving an estimate of a motion in said current video frame compared to a first video frame of said sequence of video frames;
    computing a correction value for said motion in said current video frame based on said motion estimate and on at least one state variable of said motion filtering, wherein said at least one state variable is updated in said computation; and
    in case said computed correction value exceeds a system constraint of said video stabilization system, adjusting said at least one state variable in accordance with an extent by which said system constraint is exceeded and recomputing said correction value based on said motion estimate and on said adjusted state variable.

15. The data processor readable medium according to claim 14 wherein said at least one state variable comprises a variable representing an intended motion in said current video frame and a variable representing an assumed velocity of said intended motion.

16. The data processor readable medium according to claim 14 wherein said motion is at least one of a horizontal translation, a vertical translation and a rotation, and wherein said correction value is computed and, if required, recomputed in sequence for a rotation and for a translation in horizontal and vertical direction, and wherein a system constraint for at least one of said types of motion is determined as a function of a correction value resulting for at least one other of said types of motion.

17. The apparatus according to claim 7, wherein said system constraint is related to a difference between a size of video frames input to said video stabilization system and a size of video frames output by said video stabilization system.

18. The apparatus according to claim 7, wherein said processor is configured to compute a correction value for said motion in said current video frame by using an extended Kalman filter and wherein said at least one state variable is a state variable of said extended Kalman filter, said extended Kalman filter being extended in that it implements the adjustment of said at least one state variable and the recomputation of said correction value.

19. The apparatus according to claim 7, wherein said motion is at least one of a horizontal translation, a vertical translation and a rotation.

20. An apparatus comprising a video stabilization system, said video stabilization system including:
   means for receiving an estimate of a motion in a current video frame compared to a first video frame of a sequence of video frames;
   means for computing a correction value for said motion in said current video frame based on said motion estimate and on at least one state variable, wherein said at least one state variable is updated in said computation;
   means for adjusting said at least one state variable, in case said computed correction value exceeds a system constraint of said video stabilization system, in accordance with an extent by which said system constraint is exceeded and for recomputing said correction value based on said motion estimate and on said adjusted state variable.

* * * * *

UNITED STATES PATENT AND TRADEMARK OFFICE
CERTIFICATE OF CORRECTION

| | | |
|---|---|---|
| PATENT NO. | : 7,558,405 B2 | Page 1 of 1 |
| APPLICATION NO. | : 11/174297 | |
| DATED | : July 7, 2009 | |
| INVENTOR(S) | : Tico et al. | |

It is certified that error appears in the above-identified patent and that said Letters Patent is hereby corrected as shown below:

1. At column 14, line 52, claim 14, line 4, please delete the word "steps-".

Signed and Sealed this

Fifteenth Day of September, 2009

David J. Kappos
*Director of the United States Patent and Trademark Office*